United States Patent
Tanaka et al.

(10) Patent No.: US 9,061,588 B2
(45) Date of Patent: Jun. 23, 2015

(54) VEHICLE

(71) Applicant: YAMAHA HATSUDOKI KABUSHIKI KAISHA, Iwata-shi, Shizuoka (JP)

(72) Inventors: Hiroshi Tanaka, Shizuoka (JP); Fuminao Obayashi, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 0 days.

(21) Appl. No.: 14/539,006

(22) Filed: Nov. 12, 2014

(65) Prior Publication Data
US 2015/0142242 A1    May 21, 2015

(51) Int. Cl.
G05D 1/00    (2006.01)
B60K 28/16   (2006.01)
B62M 6/45    (2010.01)

(52) U.S. Cl.
CPC . B60K 28/16 (2013.01); B62M 6/45 (2013.01)

(58) Field of Classification Search
CPC ................................. B60K 28/16; B62M 6/45
USPC ...................... 701/22, 37, 67, 69; 318/1, 139; 180/197; 280/236
See application file for complete search history.

(56) References Cited

U.S. PATENT DOCUMENTS

| | | | | |
|---|---|---|---|---|
| 6,011,366 | A * | 1/2000 | Murakami et al. | 318/1 |
| 6,549,840 | B1 * | 4/2003 | Mikami et al. | 701/69 |
| 8,825,291 | B2 * | 9/2014 | Oikawa | 701/37 |
| 8,825,324 | B2 * | 9/2014 | Horaguchi et al. | 701/67 |
| 2004/0135527 | A1 * | 7/2004 | Tatara et al. | 318/139 |
| 2012/0265400 | A1 * | 10/2012 | Oikawa | 701/37 |
| 2012/0279793 | A1 * | 11/2012 | Kikuchi et al. | 180/197 |
| 2013/0205916 | A1 * | 8/2013 | Kodama et al. | 73/862.69 |
| 2013/0226421 | A1 * | 8/2013 | Horaguchi et al. | 701/67 |
| 2014/0225346 | A1 * | 8/2014 | Bettin | 280/236 |

FOREIGN PATENT DOCUMENTS

JP    2004-243921 A    9/2004

OTHER PUBLICATIONS

Boyraz et al., Intelligent Traction Control in Electric Vehicles Using an Acoustic Approach for Online Estimation of Road-Tire Friction, 2013, IEEE, p. 1336-1343.*
Kang et al., Driving Control Algorithm for Maneuverability, Lateral Stability, and Rollover Prevention of 4WD Electric Vehicles With Independently Driven Front and Rear Wheels, 2011, IEEE, p. 2987-3001.*
Liang et al., Vehicle Pure Yaw Moment Control Using Differential Tire Slip, 2009, IEEE, p. 3331-3336.*
Lam et al., Longitudinal Wheel-slip Control for Four Wheel Independent Steering and Drive Vehicles, 2014, IEEE, p. 5280-5285.*

* cited by examiner

*Primary Examiner* — McDieunel Marc
(74) *Attorney, Agent, or Firm* — Keating & Bennett, LLP

(57) ABSTRACT

A vehicle includes a wheel, an electric motor that drives the wheel, a drive torque operator that is operated by an operator, a slip detection unit that detects a slipping state of the wheel, a torque command value calculation unit that calculates a torque command value for the electric motor, and a motor drive unit that drives the electric motor according to a calculated torque command value. When the slip detection unit has not detected a slipping state of the wheel, the torque command value calculation unit calculates a torque command value for the electric motor according to an input to the drive torque operator. When the slip detection unit has detected a slipping state of the wheel, the torque command value calculation unit calculates a torque command value that repeatedly fluctuates alternately between a first value not more than a torque command value at the time when wheel slip has been detected and a second value smaller than the first value.

11 Claims, 5 Drawing Sheets

VEHICLE

BACKGROUND OF THE INVENTION

1. Field of the Invention

The present invention relates to a vehicle that drives a wheel by an electric motor.

2. Description of the Related Art

Japanese Patent Application Publication No. 2004-243921 discloses an electrically assisted vehicle. The electrically assisted vehicle includes a human power drive system that supplies a pedal force applied to pedals to a rear wheel, an assist power drive system that supplies an assist force from an electric motor to a front wheel, and a controller that controls an assist ratio which is a ratio of the assist force with respect to the pedal force. The controller reduces the assist ratio if the occurrence of a slip of the front wheel is detected, and returns the assist ratio to its original ratio if an elimination of the slip is detected. More specifically, if a slip is detected, the controller immediately lowers the assist ratio to 5%, and then gradually increases the assist ratio to its original value.

SUMMARY OF THE INVENTION

The inventors of preferred embodiments of the present invention described and claimed in the present application conducted an extensive study and research regarding a vehicle, such as the one described above, and in doing so, discovered and first recognized new unique challenges and previously unrecognized possibilities for improvements as described in greater detail below.

It can be considered to equip a vehicle that drives a wheel by an electric motor with the function of so-called traction control. The traction control controls a driving force to be generated by the electric motor when a slipping state of the wheel is detected to recover a grip force of the wheel. In order to realize such a function, the present inventors have tried application of the technology described in Japanese Patent Application Publication No. 2004-243921. As a result, it has been discovered that the grip force of a wheel cannot be promptly recovered by a mere reduction in the assist ratio.

A preferred embodiment of the present invention provides a vehicle including a first wheel, a first electric motor configured to drive the first wheel, a drive torque operator that is operated by an operator, a slip detection unit configured to detect a slipping state of the first wheel, a first torque command value calculation unit that is configured or programmed to, at a time of no detection of a first wheel slip where the slip detection unit has not detected a slipping state of the first wheel, calculate a first torque command value for the first electric motor according to an input to the drive torque operator, and is configured or programmed to, at a time of detection of a first wheel slip where the slip detection unit has detected a slipping state of the first wheel, calculate a first torque command value that repeatedly fluctuates alternately between a first value not more than a first torque command value at the time of no detection of a first wheel slip and a second value smaller than the first value, and a first motor drive unit configured to drive the first electric motor according to a first torque command value calculated by the first torque command value calculation unit.

According to this arrangement, a slipping state of the first wheel that is driven by the first electric motor is detected by the slip detection unit. At the time of no detection of a first wheel slip, a first torque command value for the first electric motor is calculated according to an input to the drive torque operator. On the other hand, at the time of detection of a first wheel slip, the first torque command value repeatedly fluctuates alternately between the first value and the second value. The first value is a value not more than the first torque command value at the time of no detection of a first wheel slip. Also, the second value is a value smaller than the first value. The first electric motor is controlled based on such a first torque command value. As a result, when the first wheel is not slipping, a driving force according to an operation of the drive torque operator is supplied to the first wheel. A driving force according to the operator's intention is thus generated. On the other hand, when a slipping state of the first wheel is detected, as a result of the first torque command value repeatedly fluctuating alternately between the first value and the second value, a great driving force corresponding to the first value is intermittently imparted to the first wheel. Therefore, in a time period where the first torque command value has the second value, no great driving force is imparted to the first wheel, so that the first wheel promptly recovers a grip force with the road surface in that time period.

In particular, it is preferable that a transition from detection of a slipping state to an intermittent driving state of the first wheel occurs in a sufficiently short time to allow recovering a grip force of the first wheel before a rider of the vehicle senses the slipping state. A vehicle capable of avoiding a slip of the first wheel that can be sensed by the rider is thus provided.

The first torque command value calculation unit is preferably configured or programmed to generate, at the time of detection of a first wheel slip where the slip detection unit has detected a slipping state of the first wheel, a first torque command value that repeatedly fluctuates alternately between the first value and the second value such that the first torque command value has the second value two times or more (at least two times). Accordingly, a grip force of the first wheel is reliably recovered.

In a preferred embodiment of the present invention, the first value is equal to a first torque command value at a time of no detection of a first wheel slip. Because a driving force equivalent to that when no slip has occurred is accordingly intermittently imparted to the first wheel, a driving force almost equivalent to that at normal time is generated, while a grip force of the first wheel is recovered.

In a preferred embodiment of the present invention, the second value preferably is zero. Accordingly, when a slipping state of the first wheel is detected, the first wheel changes in its driving state alternately between a state of being imparted with a driving force and a state of being imparted with no driving force. Therefore, the first wheel is able to recover a grip force with the road surface reliably and promptly in a time period of the state where no driving force is imparted.

The second value is preferably a value where the first electric motor no longer imparts a driving force to the first wheel. Accordingly, the first wheel is able to recover a grip force with the road surface reliably and promptly in a time period of the state where no driving force is imparted.

The second value is preferably a value where a relative speed of the first wheel to a road surface that the first wheel contacts becomes zero. Because a contact surface of the first wheel with the road surface accordingly reaches a state of standstill with respect to the road surface, a static friction force acts therebetween. The first wheel thus recovers a grip force with respect to the road surface reliably and promptly. That is, there is a transition from a state in which the first wheel and the road surface cause a slip to have a kinetic friction force acting therebetween to a state in which the relative speed of the first wheel and the road surface becomes zero to have a static friction force acting therebetween. Because the static friction force is greater than the kinetic friction force, the first wheel recovers a grip force with respect to the road surface reliably and promptly.

The vehicle according to a preferred embodiment of the present invention further includes a second wheel separate from the first wheel, and the slip detection unit is configured to judge whether the first wheel is in a slipping state by a comparison of a rotation speed of the first wheel with a rotation speed of the second wheel. According to this arrangement, a slipping state of the first wheel is reliably detected by a comparison in the rotation speed of the first and second wheels. The first wheel is thus reliably recovered from the slipping state.

The slip detection unit preferably is configured to judge the first wheel to be in a slipping state when a value obtained by subtracting second vehicle speed information corresponding to a rotation speed of the second vehicle from first vehicle speed information corresponding to a rotation speed of the first wheel exceeds a predetermined positive threshold. When the outer diameters of the first wheel and the second wheel are equal, a conversion ratio between the rotation speed of the first wheel and the vehicle speed is equal to a conversion ratio between the rotation speed of the second wheel and the vehicle speed. Therefore, when the outer diameters of the first wheel and the second wheel are equal, the slip detection unit preferably is configured to judge the first wheel to be in a slipping state when a value obtained by subtracting the rotation speed of the second wheel from the rotation speed of the first wheel exceeds a predetermined positive threshold. That is, the rotation speed of the first wheel preferably is used as it is as first vehicle speed information, and the rotation speed of the second wheel preferably is used as it is as second vehicle speed information.

The vehicle according to a preferred embodiment of the present invention further includes a second wheel separate from the first wheel, a second electric motor separate from the first electric motor, configured to drive the second wheel, a second torque command value calculation unit that is configured or programmed to, at a time of no detection of a first wheel slip where the slip detection unit has not detected a slipping state of the first wheel, calculate a second torque command value for the second electric motor according to an input to the drive torque operator, and is configured to, at a time of detection of a first wheel slip where the slip detection unit has detected a slipping state of the first wheel, calculate a second torque command value greater than a second torque command value at the time of no detection of a first wheel slip, and a second motor drive unit that is configured to drive the second electric motor according to a second torque command value calculated by the second torque command value calculation unit.

In this arrangement, the first electric motor that is configured to drive the first wheel and the second electric motor that is configured to drive the second wheel are provided. The second torque command value calculation unit calculates a second torque command value to control the second electric motor. If a slipping state of the first wheel has not been detected, the second torque command value calculation unit calculates a second torque command value according to an input to the drive torque operator. On the other hand, if the first wheel is in a slipping state, the second torque command value calculation unit calculates a second torque command value greater than that at the time of no detection of a first wheel slip. Because a reduction in the driving force of the first wheel to reach an intermittent driving state is accordingly made up by an increase in the driving force of the second wheel, a driving force that is sufficient as a whole is imparted to the vehicle.

In a preferred embodiment of the present invention, the slip detection unit is preferably configured to further detect a slipping state of the second wheel, the first torque command value calculation unit is configured or programmed to, at a time of no detection of a both wheels slip where the slip detection unit has detected a slipping state of neither the first wheel nor the second wheel, calculate a first torque command value for the first electric motor according to an input to the drive torque operator, and is configured to, at a time of detection of a first wheel slip where the slip detection unit has detected a slipping state of the first wheel, calculate a first torque command value that repeatedly fluctuates alternately between a first value not more than a first torque command value at the time of no detection of a both wheels slip and a second value smaller than the first value, and is configured to, at a time of detection of a second wheel slip where the slip detection unit has detected a slipping state of the second wheel, calculate a first torque command value greater than a first torque command value at the time of no detection of a both wheels slip, and the second torque command value calculation unit is configured or programmed to, at a time of no detection of a both wheels slip where the slip detection unit has detected a slipping state of neither the first wheel nor the second wheel, calculate a second torque command value for the second electric motor according to an input to the drive torque operator, and is configured to, at a time of detection of a second wheel slip where the slip detection unit has detected a slipping state of the second wheel, calculate a second torque command value that repeatedly fluctuates alternately between a third value not more than a second torque command value at the time of no detection of a both wheels slip and a fourth value smaller than the third value, and is configured to, at a time of detection of a first wheel slip where the slip detection unit has detected a slipping state of the first wheel, calculate a second torque command value greater than a second torque command value at the time of no detection of a both wheels slip.

In this arrangement, a slipping state of the second wheel is also detected in addition to a slipping state of the first wheel. When neither the first wheel nor the second wheel is in a slipping state, the first torque command value and the second torque command value both have values according to an input to the drive torque operator. When the first wheel reaches a slipping state, the first torque command value repeatedly fluctuates alternately between the first value not more than a normal value and the second value smaller than the first value. On the other hand, the second torque command value is provided as a value greater than that at normal time, so that a reduction in the driving force of the first wheel is made up by an increase in the driving force of the second wheel. Similarly, when the second wheel reaches a slipping state, the second torque command value repeatedly fluctuates alternately between the third value not more than a normal value and the fourth value smaller than the third value. Therefore, the second wheel reaches an intermittent driving state. The slipping state of the second wheel is thus promptly eliminated, so that the second wheel recovers a grip force. On the other hand, the first torque command value is provided as a value greater than that at normal time, so that a reduction in the driving force of the second wheel is made up by an increase in the driving force of the first wheel. In this manner, when either one of the first wheel and the second wheel reaches a slipping state, the wheel having reached a slipping state is intermittently driven, and its grip force is promptly recovered. On the other hand, as a result of the driving force of the other wheel not in a slipping state being increased, a driving force that is sufficient as a whole is imparted to the vehicle. Accordingly, an electric vehicle that is capable of stable running and is capable of generating a stable driving force irrespective of road surface conditions is provided.

The second torque command value calculation unit is preferably configured or programmed to, at the time of detection of a second wheel slip where the slip detection unit has detected a slipping state of the second wheel, generate a second torque command value that repeatedly fluctuates alternately between the third value and the fourth value such that the second torque command value has the fourth value that is about two times or more (at least two times), for example. Accordingly, a grip force of the second wheel is reliably recovered.

In a preferred embodiment of the present invention, the first torque command value calculation unit is configured or programmed to continuously change the first torque command value at a time of detection of a second wheel slip. Accordingly, because the driving force of the first wheel continuously increases when the second wheel is intermittently driven, even when the second wheel is in a slipping state, fluctuations in the driving force are significantly reduced to provide the vehicle with an excellent riding feeling.

In a preferred embodiment of the present invention, the second torque command value calculation unit is configured or programmed to continuously change the second torque command value at a time of detection of a first wheel slip. Accordingly, because the driving force of the second wheel continuously increases when the first wheel is intermittently driven, even when the first wheel is in a slipping state, fluctuations in the driving force are reduced to provide the vehicle with an excellent riding feeling.

In a preferred embodiment of the present invention, the first torque command value calculation unit and the second torque command value calculation unit are configured or programmed to, at a time of slip detection of the first wheel or the second wheel, respectively calculate first and second torque command values such that a sum of a time averaged value of a first torque command value and a time averaged value of a second torque command value becomes equal to a time averaged value of a sum of a first torque command value and a second torque command value at a time of no slip detection. According to this arrangement, a sum of a time averaged value of the first torque command value and a time averaged value of the second torque command value is equal between the time of slip detection and the time of no slip detection. Because a driving force that is equal as a whole is therefore able to be imparted to the vehicle regardless of whether being in a slipping state, the driving force is stabilized, and a satisfactory riding feeling is obtained.

In a preferred embodiment of the present invention, the drive torque operator preferably includes an accelerator operator that is operated by an operator. The accelerator operator is operated by an operator in order to accelerate and decelerate the vehicle.

In a preferred embodiment of the present invention, the drive torque operator preferably includes pedals to input human power by an operator. There may be an arrangement such that a pedal force applied to the pedals is transmitted to at least one wheel provided in the vehicle so as to impart a human power torque to drive the wheel.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
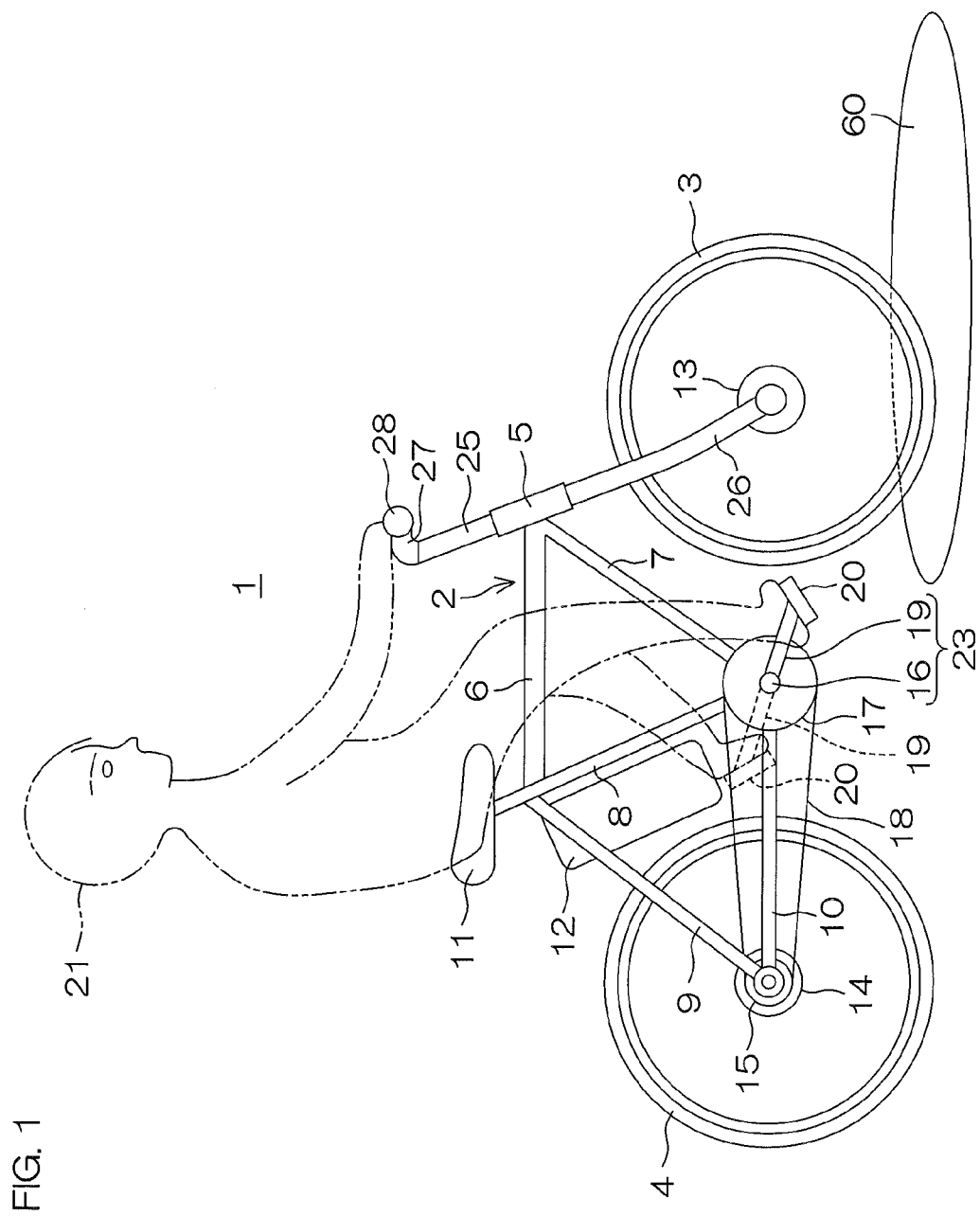
FIG. 1 is a side view for describing a configuration of a vehicle according to a preferred embodiment of the present invention.

FIG. 1 is a side view for describing a configuration of a vehicle according to a preferred embodiment of the present invention. The vehicle is an electric vehicle provided with an arrangement to transmit a driving force of an electric motor to a wheel, and more specifically, preferably is a two-wheeled electric vehicle 1 including a front wheel 3 and a rear wheel 4. Further, the two-wheeled electric vehicle 1 includes a human power drive system configured to drive the rear wheel 4 by human power.

The two-wheeled electric vehicle 1 includes a frame 2 that includes a vehicle body, a front wheel 3 attached to the frame 2, and a rear wheel 4 also attached to the frame 2. In the present preferred embodiment, the front wheel 3 and the rear wheel 4 are equal or substantially equal in outer diameter to each other. The frame 2 includes a head pipe 5, an upper pipe 6, a front pipe 7, a seat pipe 8, a pair of left and right rear pipes 9, and a pair of left and right lower pipes 10. The upper pipe 6 extends rearward from the head pipe 5. The front pipe 7 is disposed under the upper pipe 6, and extends obliquely downward from the head pipe 5 toward the rear. The seat pipe 8 extends upward from the rear end portion of the front pipe 7. The rear end portion of the upper pipe 6 is coupled to the seat pipe 8. A saddle 11 is attached to the upper end portion of the seat pipe 8. Under the saddle 11, a battery 12 is attached to the seat pipe 8.

The pair of rear pipes 9 are parallel or substantially parallel to each other. The pair of rear pipes 9 extend rearward and obliquely downward from the rear end portion of the upper pipe 6. On the other hand, the pair of lower pipes 10 are parallel or substantially parallel to each other. The pair of lower pipes 10 extend rearward from the rear end portion of the front pipe 7 horizontally or substantially horizontally. Rear end portions of the pair of rear pipes 9 are respectively coupled with rear end portions of the pair of lower pipes 10. A rear wheel sprocket 15 and the rear wheel 4 are freely rotatably attached to the coupling portion of the rear pipes 9 and the lower pipes 10. The rear wheel 4 includes a hub in which a rear wheel electric motor 14 is incorporated. The rear wheel electric motor 14 is configured to impart a driving force to the rear wheel 4.

A crankshaft 16 is freely rotatably attached to a coupling portion of the front pipe 7 and the seat pipe 8, such that the crankshaft extends horizontally to the left and right. A drive sprocket 17 is attached to the crankshaft 16. An endless chain 18 is wound around the drive sprocket 17 and the rear wheel sprocket 15. A rotation of the crankshaft 16 is therefore transmitted from the drive sprocket 17 via the chain 18 to the rear wheel sprocket 15. A pair of crank arms 19 are respectively attached to both end portions of the crankshaft 16. The crankshaft 16 and the pair of crank arms 19 constitute a crank 23. A pair of pedals 20 are respectively attached to the pair of crank arms 19. By a driver 21 operating the pedals 20, the crankshaft 16 is rotated, which enables driving of the rear wheel 4 by human power.

A steering shaft 25 is freely rotatably inserted into the head pipe 5. A pair of front forks 26 are attached parallel or substantially parallel to each other to a lower end portion of the steering shaft 25. The front wheel 3 is freely rotatably attached to lower end portions of the pair of front forks 26. The front wheel 3 includes a hub in which a front wheel electric motor 13 is incorporated. The front wheel electric motor 13 is configured to impart a driving force to the front wheel 3. A handle bar 27 is attached to the upper end of the steering shaft 25. The handle bar 27 extends horizontally or substantially horizontally, and includes a pair of grips 28 that are respectively grasped by the right hand and left hand of the driver 21. By the driver 21 operating the handle bar 27 to turn to the left and right, the steering shaft 25 turns about an axis center of the head pipe 5, and in accordance therewith, the front forks 26 and the front wheel 3 integrally turn to the left and right. The electrically assisted vehicle 1 is thus steered. The right-side grip 28 as viewed by the driver 21 is configured to be rotatable with respect to an axis of the handle bar 27, and is an accelerator grip configured to adjust the output of the rear wheel electric motor 14 and the front wheel electric motor 13. The accelerator grip is an example of an accelerator operator.

The two-wheeled electric vehicle 1 is provided with a function of detecting a slipping state of the front wheel 3 or the rear wheel 4 and promptly recovering a grip force. When the front wheel 3 and the rear wheel 4 are different in the conditions of a road surface with which each wheel is in contact, such as, for example, when the front wheel 3 has reached a manhole cover 60, a slip of the wheel located on a road surface with a smaller coefficient of friction is likely to occur.

Figure 2:
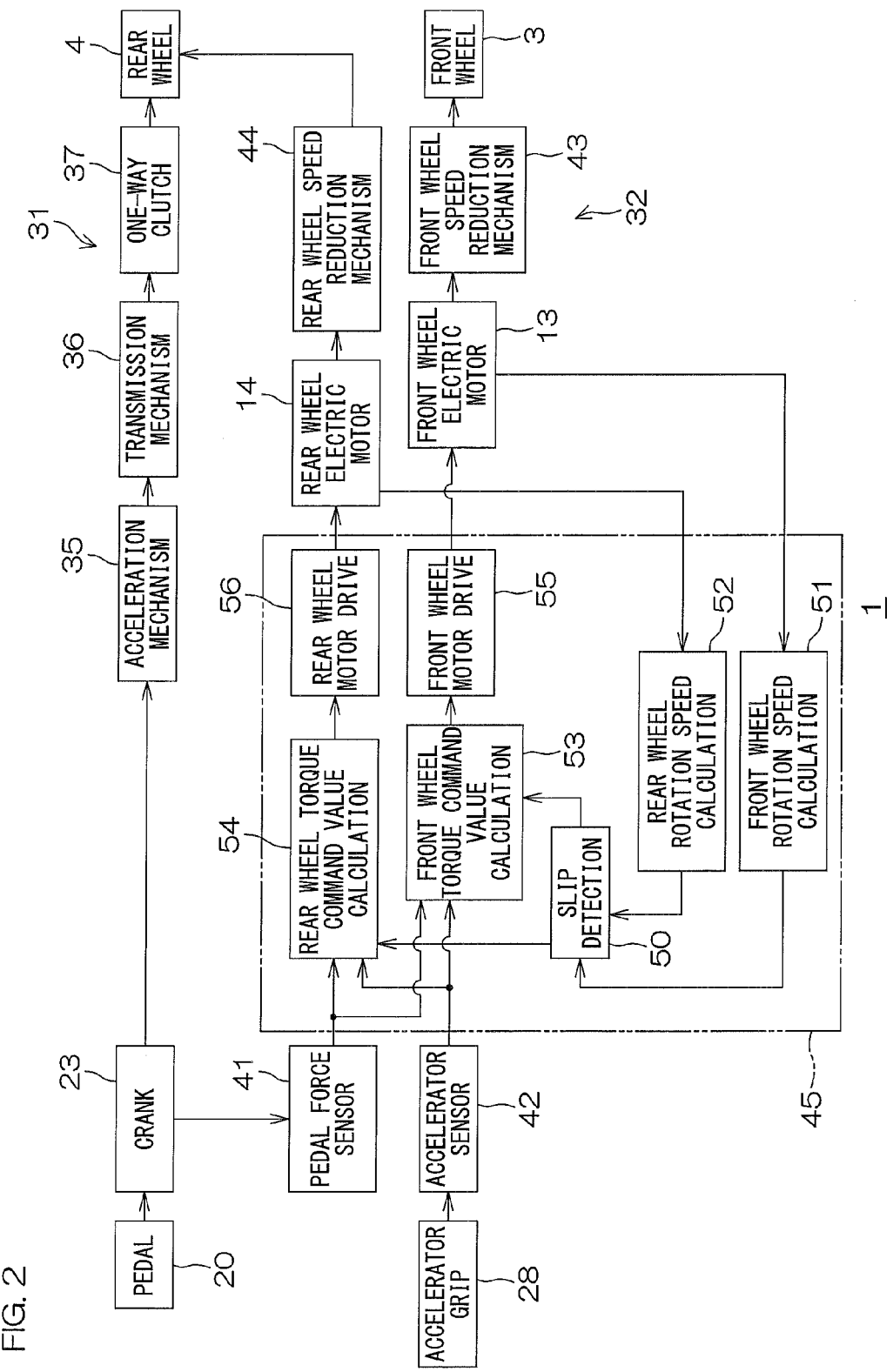
FIG. 2 is a block diagram for describing a configuration of a control system of the vehicle.

FIG. 2 is a block diagram for describing a configuration of a control system of the electrically assisted vehicle 1. The electrically assisted vehicle 1 includes a human power drive system 31 configured to transmit a pedal force applied to the pedals 20 by the driver 21 at a predetermined gear shift ratio to be supplied to the rear wheel 4, and an electromotive drive system 32 configured to supply driving forces of the rear wheel electric motor 14 and the front wheel electric motor 13 to the rear wheel 4 and the front wheel 3, respectively.

The human power drive system 31 includes the crank 23 that rotates due to a pedal force applied to the pedals 20, an acceleration mechanism 35, a transmission mechanism 36, and a one-way clutch 37. The acceleration mechanism 35 includes the drive sprocket 17, the chain 18, and the rear wheel sprocket 15. The rotation of the crank 23 is accelerated according to a gear ratio between the drive sprocket 17 and the rear wheel sprocket 15. The transmission mechanism 36 is, for example, housed in the rear wheel hub, and arranged to shift a rotation of an input shaft coupled to the rear wheel sprocket 15 at any of the plurality of (for example, three) gear shift ratio stages to be output to an output shaft. The one-way clutch 37 transmits a rotating force in one direction (forward drive direction) of the output shaft of the transmission mechanism 36 to the rear wheel 4, and does not transmit a rotation in the other direction (reverse drive direction). Therefore, a rotating force in the forward drive direction (human power torque) applied to the crank 23 is changed in speed by the transmission mechanism 36 after being accelerated by the acceleration mechanism 35, and is transmitted to the rear wheel 4 via the one-way clutch 37.

The electromotive drive system 32 drives the rear wheel electric motor 14 and the front wheel electric motor 13 according to an output of a pedal force sensor 41 or an output of an accelerator sensor 42. The pedal force sensor 41 detects a pedal force (torque) applied to the crank 23, and outputs a pedal force signal according to the pedal force. The accelerator sensor 42 detects an operation amount of the accelerator grip 28, and outputs an accelerator signal according to the operation amount. The pedals 20 and the accelerator grip 28 are examples of a drive torque operator that is operated by an operator to set a drive torque to be generated by the electric motors 13, 14. The pedal force sensor 41 and the accelerator sensor 42 are examples of an operation amount sensor to detect an operation amount (operating force or displacement amount) of the drive torque operator.

The electromotive drive system 32 includes the pedal force sensor 41, the accelerator sensor 42, the front wheel electric motor 13, the rear wheel electric motor 14, a front wheel speed reduction mechanism 43, a rear wheel deceleration speed reduction 44, and a controller 45. The controller 45 is configured or programmed to drive the front wheel electric motor 13 and the rear wheel electric motor 14 according to an output of the pedal force sensor 41 or the accelerator sensor 42. A rotation of the front wheel electric motor 13 is reduced by the front wheel speed reduction mechanism 43, and transmitted to the front wheel 3. A rotation of the rear wheel electric motor 14 is reduced by the rear wheel speed reduction mechanism 44, and transmitted to the rear wheel 4.

The controller 45 is configured or programmed to include a front wheel torque command value calculation unit 53 and a rear wheel torque command value calculation unit 54 that calculate a front wheel torque command value and a rear wheel torque command value, respectively, according to an output of the pedal force sensor 41 or the accelerator sensor 42. Further, the controller 45 is configured or programmed to include a front wheel motor drive unit 55 that drives the front wheel electric motor 13 based on a front wheel torque command value, and a rear wheel motor drive unit 56 that drives the rear wheel electric motor 14 based on a rear wheel torque command value. The front wheel torque command value is a command value for a drive torque that needs to be generated by the front wheel electric motor 13. The rear wheel torque command value is a command value for a drive torque that needs to be generated by the rear wheel electric motor 14. The front wheel motor drive unit 55 and the rear wheel motor drive unit 56 are configured or programmed to perform a PWM (pulse width modulation)-control of a drive voltage from the battery 12 at duty ratios respectively corresponding to the front wheel torque command value and rear wheel torque command value. The PWM-controlled drive voltages are applied to the front wheel electric motor 13 and the rear wheel electric motor 14. Drive currents respectively corresponding to the front wheel torque command value and rear wheel torque command value thus flow to the front wheel electric motor 13 and the rear wheel electric motor 14.

The controller 45 is configured or programmed to further include a slip detection unit 50 that detects a slipping state of the front wheel 3 and a slipping state of the rear wheel 4. The controller 45 is also configured or programmed to further include a front wheel rotation speed calculation unit 51 that calculates a front wheel rotation speed from a rotation speed of the front wheel electric motor 13, and a rear wheel rotation speed calculation unit 52 that calculates a rear wheel rotation speed from a rotation speed of the rear wheel electric motor 14. In the present preferred embodiment, because the outer diameters of the front wheel 3 and the rear wheel 4 are equal or substantially equal, a conversion ratio between the front wheel rotation speed and the speed of the two-wheeled electric vehicle 1 is equal or substantially equal to a conversion ratio between the rear wheel rotation speed and the speed of the two-wheeled electric vehicle 1. The slip detection unit 50 detects a slipping state of the front wheel 3 and a slipping state of the rear wheel 4 based on the front wheel rotation speed and rear wheel rotation speed calculated by the front wheel rotation speed calculation unit 51 and the rear wheel rotation speed calculation unit 52, respectively. If the front wheel and rear wheel speed reduction mechanisms 43 and 44 are equal in reduction ratio to each other, the front wheel and rear wheel rotation speed calculation units 51 and 52 may output the rotation speeds of the front wheel and rear wheel electric motors 13 and 14 as information representing a front wheel rotation speed and a rear wheel rotation speed, respectively.

Figure 3:
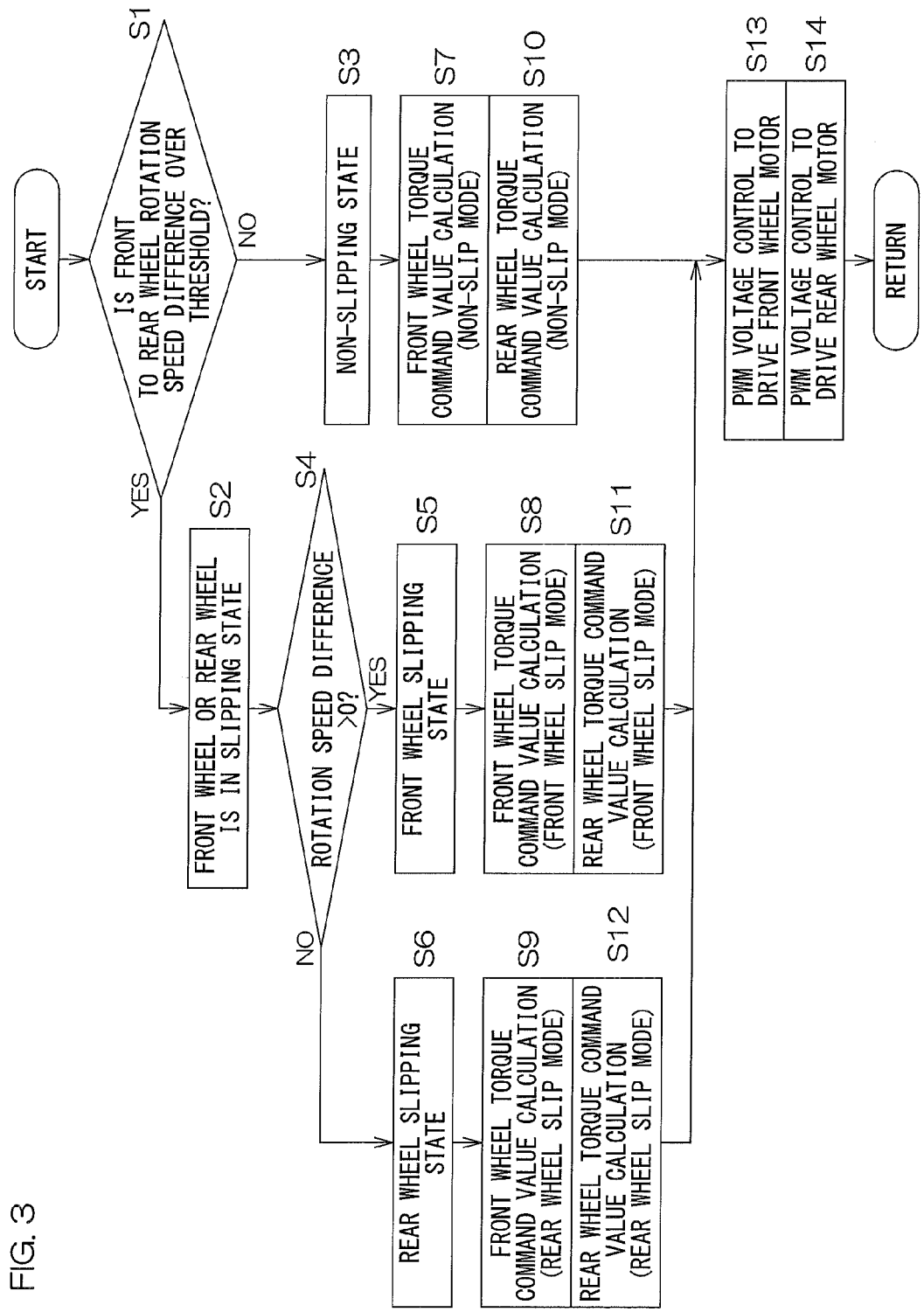
FIG. 3 is a flowchart for describing an operation example of a controller provided in the vehicle.

FIG. 3 is a flowchart for describing a specific operation example of the controller 45. When the absolute value of a front to rear wheel rotation speed difference that is obtained by subtracting the rear wheel rotation speed from the front wheel rotation speed is over a predetermined threshold (step S1: YES), the slip detection unit 50 determines that either the front wheel 3 or the rear wheel 4 is in a slipping state (step S2). Or if not so (step S1: NO), the slip detection unit 50 determines that neither the front wheel 3 nor the rear wheel 4 is in a slipping state (step S3: No front wheel slip detected, no rear wheel slip detected, no both wheels slip detected).

When it is determined that either the front wheel 3 or the rear wheel 4 is in a slipping state (step S2), if the front to rear wheel rotation speed difference is positive (step S4: YES), the slip detection unit 50 further determines that the front wheel 3 is in a slipping state (front wheel slip detected) (step S5). On the other hand, if the front to rear wheel rotation speed difference is negative (step S4: NO), the slip detection unit 50 determines that the rear wheel 4 is in a slipping state (step S6: Rear wheel slip detected). That is, when the absolute value of a rotation speed difference between the front wheel 3 and the rear wheel 4 is greater than the threshold, the slip detection unit 50 determines that a wheel of a greater rotation speed out of the front wheel 3 and the rear wheel 4 is in a slipping state.

When the front wheel 3 and the rear wheel 4 are in a non-slipping state (step S3), the front wheel torque command value calculation unit 53 performs a front wheel torque command value calculation according to a non-slip mode (normal mode) (step S7). When the front wheel 3 is in a slipping state (step S5), the front wheel torque command value calculation unit 53 performs a front wheel torque command value calculation according to a front wheel slip mode (step S8). When the rear wheel 4 is in a slipping state (step S6), the front wheel torque command value calculation unit 53 performs a front wheel torque command value calculation according to a rear wheel slip mode (step S9).

Similarly, when the front wheel 3 and the rear wheel 4 are in a non-slipping state (step S3), the rear wheel torque command value calculation unit 54 performs a rear wheel torque command value calculation according to a non-slip mode (normal mode) (step S10). When the front wheel 3 is in a slipping state (step S5), the rear wheel torque command value calculation unit 54 performs a rear wheel torque command value calculation according to a front wheel slip mode (step S11). When the rear wheel 4 is in a slipping state (step S6), the rear wheel torque command value calculation unit 54 performs a rear wheel torque command value calculation according to a rear wheel slip mode (step S12).

Then, the front wheel motor drive unit 55, by PWM-controlling a drive voltage at a duty ratio corresponding to the front wheel torque command value, causes a current corresponding to the front wheel torque command value to flow to the front wheel electric motor 13 (step S13). Similarly, the rear wheel motor drive unit 56, by PWM-controlling a drive voltage at a duty ratio corresponding to the rear wheel torque command value, causes a current corresponding to the rear wheel torque command value to flow to the rear wheel electric motor 14 (step S14). The same operation is repeated with a predetermined control period.

The front wheel torque command value calculation unit 53, in the non-slip mode (step S7), calculates a larger front wheel torque command value as the output of the pedal force sensor 41 or the accelerator sensor 42 is greater, specifically, a front wheel torque command value proportional to the pedal force or accelerator operation amount. Similarly, the rear wheel torque command value calculation unit 54, in the non-slip mode (step S10), calculates a larger rear wheel torque command value as the output of the pedal force sensor 41 or the accelerator sensor 42 is greater, specifically, a rear wheel torque command value proportional to the pedal force or accelerator operation amount.

The front wheel torque command value calculation unit 53, in the front-wheel slip mode (step S8), calculates a front wheel torque command value that repeatedly fluctuates in a pulsed manner alternately between a first value and a second value smaller than the first value. The first value may be equal to a front wheel torque command value in the non-slip mode (a value according to the output of the pedal force sensor 41 or the accelerator sensor 42), and may be a smaller value than the value in the non-slip mode. The second value may be zero. In this case, the front wheel torque command value shows pulsed fluctuations to intermittently take a significant value (a value to impart a forward driving force to the front wheel 3). More specifically, the front wheel torque command value may be determined so as to show fluctuations having a pulse shape with a pulse width determined such that the duration to take the first value is gradually reduced, and such that the front wheel torque command value has a gradually decreasing time averaged value. The second value may be a negative value (a value to impart a torque to a braking side). The front wheel torque command value calculation unit 53 preferably generates a front wheel torque command value that repeatedly fluctuates alternately between the first value and second value such that the front wheel torque command value takes the second value about two times or more (at least about two times), for example.

On the other hand, the rear wheel torque command value calculation unit 54, in the front wheel slip mode (step S11), generates a rear wheel torque command value of characteristics in which it increases so as to make up a decrease in the time averaged value of the front wheel torque command value. The rear wheel torque command value is preferably set in this case so as to show continuous fluctuations, rather than to show pulsed fluctuations.

The rear wheel torque command value calculation unit 54, in the rear-wheel slip mode (step S12), calculates a rear wheel torque command value that repeatedly fluctuates in a pulsed manner alternately between a third value and a fourth value smaller than the third value. The third value may be equal to a rear wheel torque command value in the non-slip mode (a value according to the output of the pedal force sensor 41 or the accelerator sensor 42), and may be a smaller value than the value in the non-slip mode. The fourth value may be zero. In this case, the rear wheel torque command value shows pulsed fluctuations to intermittently take a significant value (a value to impart a forward driving force to the rear wheel 4). More specifically, the rear wheel torque command value may be determined so as to show fluctuations having a pulse shape with a pulse width determined such that the duration to take the third value is gradually reduced, and such that the rear wheel torque command value has a gradually decreasing time averaged value. The fourth value may be a negative value (a value to impart a torque to a braking side). The rear wheel torque command value calculation unit 54 preferably generates a rear wheel torque command value that repeatedly fluctuates alternately between the third value and fourth value such that the rear wheel torque command value takes the fourth value about two times or more (at least about two times), for example.

On the other hand, the front wheel torque command value calculation unit 53, in the rear wheel slip mode (step S9), generates a front wheel torque command value of characteristics in which it increases so as to make up a decrease in the time averaged value of the rear wheel torque command value. The front wheel torque command value is preferably set in this case so as to show continuous fluctuations, rather than to show pulsed fluctuations.

Figure 4A:
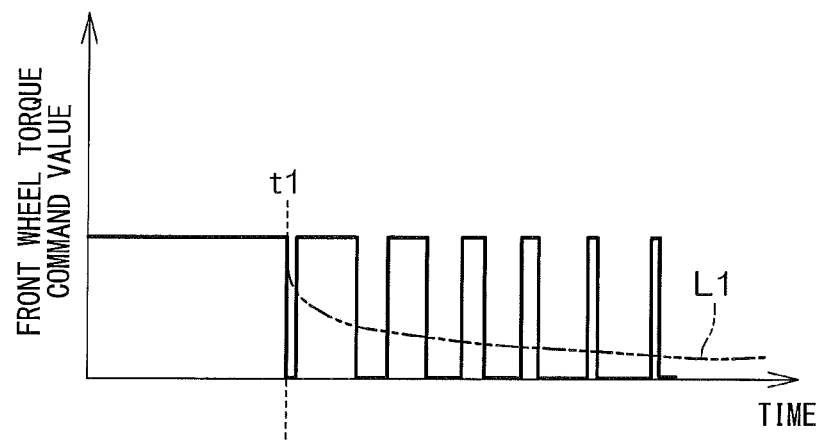
FIG. 4A is a waveform chart showing an example of a front wheel torque command value in the case of a front wheel slip mode.

FIG. 4A shows an example of the front wheel torque command value in the case of a front wheel slip mode (a torque command value to a wheel in a slipping state). In contrast, FIG. 4B shows an example of the rear wheel torque command value in the case of a front wheel slip mode (a torque command value to a wheel in a non-slipping state).

When a slipping state of the front wheel 3 is detected at time t1, as shown in FIG. 4A, the front wheel torque command value fluctuates in accordance with a periodic pulsed waveform, and reaches zero about two times or more (at least about two times), for example. The front wheel torque command value is gradually reduced in duration (pulse width) to take a significant value (a value greater than 0) in each period. More specifically, as a result of PID (proportional integral derivative) control to lead a rotation speed difference (slip amount) between the front wheel 3 and the rear wheel 4 to zero being carried out, an appropriate pulse width according to the slip amount is obtained. A driving force is thus intermittently imparted to the front wheel 3, and the duration for which the driving force is imparted is gradually reduced. That is, the ratio (duty ratio) of a time period where the front wheel torque command value takes a significant value in a certain period (for example, about 0.1 seconds) gradually reduces. Accordingly, the time averaged value of the front wheel torque command value gradually decreases as shown by curve L1. The time averaged value may be an average value of front wheel torque command values during each period. A time integrated value of the front wheel torque command value in each period may be used as an alternative value for the time averaged value.

Figure 4B:
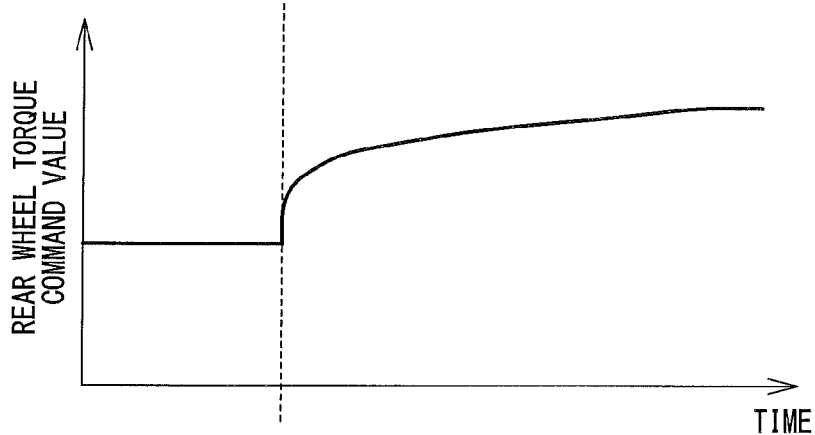
FIG. 4B is a waveform chart showing an example of a rear wheel torque command value in the case of a front wheel slip mode.

On the other hand, as shown in FIG. 4B, the rear wheel torque command value shows changes in which it increases so as to make up a decrease in the time averaged value of the front wheel torque command value. More specifically, as a result of PID (proportional integral derivative) control to lead a rotation speed difference (slip amount) between the front wheel 3 and the rear wheel 4 to zero being carried out, an appropriate rear wheel torque command value according to the slip amount is obtained. However, the rear wheel torque command value continuously increases without showing pulsed fluctuations as those of the front wheel torque command value. Thus, a sum of a time averaged value (or a time integrated value) of the front wheel torque command value and a time averaged value (or a time integrated value) of the rear wheel torque command value in the front-wheel slip mode becomes equal to a time averaged value (or a time integrated value) of a sum of the front wheel torque command value and the rear wheel torque command value in the non-slip mode. Accordingly, the sum of time averaged values (or time integrated values) of driving forces that are respectively imparted to the front wheel 3 and the rear wheel 4 is kept even in a slipping state at the same or substantially the same value as that in a non-slipping state.

In the case of a rear wheel slip mode, for example, the rear wheel torque command value shows changes following the waveform shown in FIG. 4A, and the front wheel torque command value shows changes following the waveform shown in FIG. 4B.

Figure 5A:
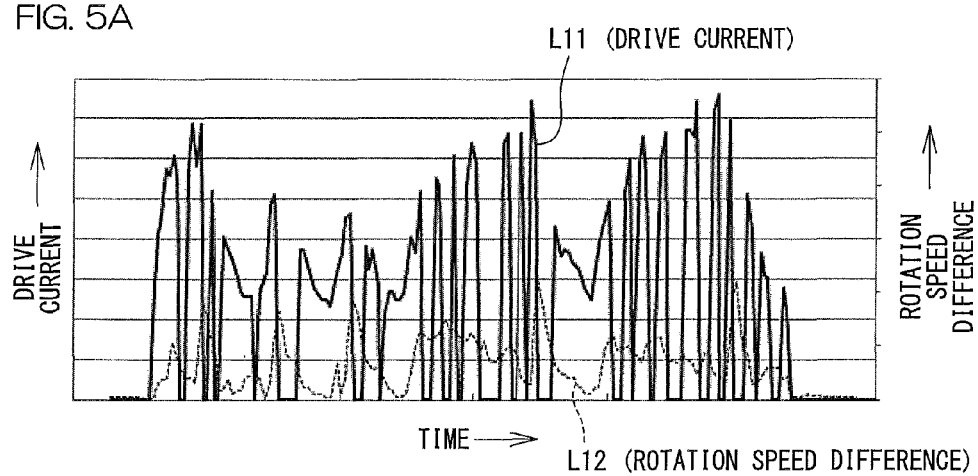
FIG. 5A is a waveform chart for describing an operation test example of a working example.

FIG. 5A shows an operation test example (working example) when the rear wheel 4 is fixed in a non-rotating state and the accelerator grip 28 is operated for acceleration. Curve L11 shows temporal changes in drive current of the front wheel electric motor 13, and curve L12 shows a rotation speed difference between the front wheel 3 and the rear wheel 4 (=front wheel rotation speed−rear wheel rotation speed). The front wheel 3 is in a slipping state when the rotation speed difference is positive. When the front wheel 3 rotates as a result of a drive current being imparted to the front wheel electric motor 13, the rotation speed difference becomes positive, and the front wheel 3 reaches a slipping state. In response thereto, the drive current of the front wheel electric motor 13 fluctuates in a pulsed manner between a significant value and zero. The front wheel 3 is thus led into a state of standstill with respect to the road surface, and the slipping state is promptly eliminated. More specifically, the rotation speed difference promptly decreases every time the drive current reaches zero, and the slipping state is thus suppressed. Moreover, because the drive current reaches zero before the rotation speed difference becomes great, a great rotation speed difference does not occur.

Figure 5B:
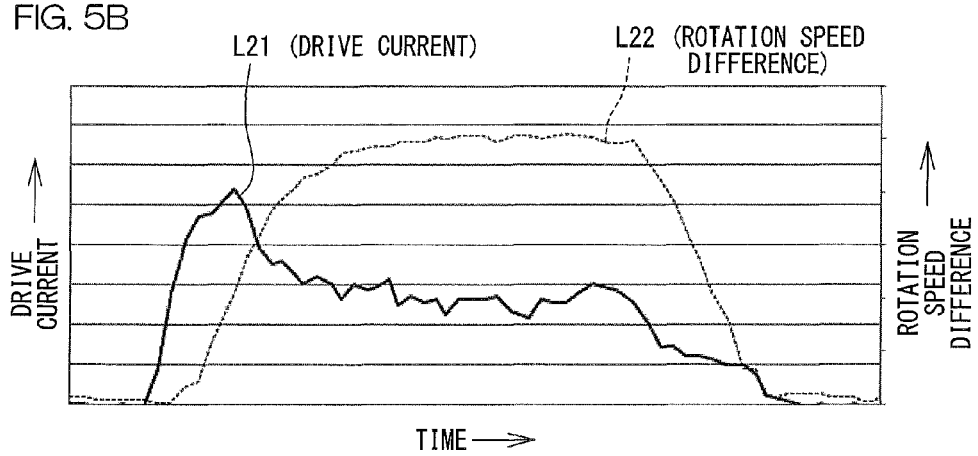
FIG. 5B is a waveform chart for describing an operation test example of a comparative example.

FIG. 5B shows an operation test example of a comparative example, and shows an example where driving of the front wheel electric motor 13 is controlled by the foregoing front wheel torque command value according to the non-slip mode when the rear wheel 4 is fixed in a non-rotating state and the accelerator grip 28 is operated for acceleration. Curve L21 shows temporal changes in drive current of the front wheel electric motor 13, and curve L22 shows a rotation speed difference between the front wheel 3 and the rear wheel 4 (=front wheel rotation speed−rear wheel rotation speed). When the front wheel 3 reaches a slipping state, the slipping state of the front wheel 3 continues until the accelerator grip 28 is returned to a deceleration side to reduce the drive current.

In the working example of FIG. 5A, a slipping state of the front wheel is restored quickly before the driver senses the slipping state, whereas in the comparative example of FIG. 5B, a slipping state of the front wheel cannot be eliminated until the driver senses the slipping state and performs an operation to return the accelerator grip according thereto. Moreover, in the working example of FIG. 5A, the maximum value of the rotation speed difference is remarkably small as compared with that in the comparative example of FIG. 5B, and the slipping states are effectively suppressed.

As described above, in the present preferred embodiment, at the time of no detection of a front wheel slip (non-slip mode), a front wheel torque command value is calculated according to an output of the pedal force sensor 41 or the accelerator sensor 42. Therefore, when the front wheel 3 is not slipping, a driving force according to an output of the pedal force sensor 41 or the accelerator sensor 42 is supplied to the front wheel 3. A driving force according to the driver's intention is thus generated from the front wheel electric motor 13. On the other hand, at the time of detection of a front wheel slip (front wheel slip mode), the front wheel torque command value repeatedly fluctuates alternately between the first value and second value. Preferably, the front wheel torque command value takes the second value at least two times. As a result of the front wheel torque command value repeatedly fluctuating alternately between the first value and the second value smaller than the first value in this manner, a great driving force corresponding to the first value is intermittently imparted to the front wheel 3. Therefore, in a time period where the front wheel torque command value has the second value, no great driving force is imparted to the front wheel 3, so that the front wheel 3 promptly recovers a grip force with the road surface in that period. The front wheel 3 thus avoids slipping, while generating a forward driving force.

Similarly, at the time of no detection of a rear wheel slip (non-slip mode), a rear wheel torque command value is calculated according to an output of the pedal force sensor 41 or the accelerator sensor 42. Therefore, when the rear wheel 4 is not slipping, a driving force according to an output of the pedal force sensor 41 or the accelerator sensor 42 is supplied to the rear wheel 4. A driving force according to the driver's intention is thus generated from the rear wheel electric motor 14. On the other hand, at the time of detection of a rear wheel slip (rear wheel slip mode), the rear wheel torque command value repeatedly fluctuates alternately between the third value and the fourth value smaller than the third value. Preferably, the rear wheel torque command value takes the fourth value at least two times. As a result of the rear wheel torque command value repeatedly fluctuating alternately between the third value and fourth value in this manner, a great driving force corresponding to the third value is intermittently imparted to the rear wheel 4. Therefore, in a time period where the rear wheel torque command value has the fourth value, no great driving force is imparted to the rear wheel 4, so that the rear wheel 4 promptly recovers a grip force with the road surface in that period. The rear wheel 4 thus avoids slipping, while generating a forward driving force.

It is preferable that a transition from detection of a slipping state to an intermittent driving state of the front wheel 3 or the rear wheel 4 occurs in a sufficiently short time to allow recovering a grip force of the front wheel 3 or the rear wheel 4 before a rider of the two-wheeled electric vehicle 1 senses the slipping state. A slip of the front wheel 3 or the rear wheel 4 that can be sensed by the rider is thus avoided.

Further, if the first value has been made equal to a front wheel torque command value at the time of no detection of a front wheel slip, at the time of a front wheel slip, a driving force equivalent to that when no front wheel slip has occurred is intermittently imparted to the front wheel 3. As a result, a driving force almost equivalent to that at normal time is generated, while a grip force of the front wheel 3 is capable of being recovered. Similarly, if the third value has been made equal to a rear wheel torque command value at the time of no detection of a rear wheel slip, at the time of a rear wheel slip, a driving force equivalent to that when no rear wheel slip has occurred is intermittently imparted to the rear wheel 4. As a result, a driving force almost equivalent to that at normal time is generated, while a grip force of the rear wheel 4 is recovered.

Further, if the second value is provided as zero, when a slipping state of the front wheel 3 is detected, the front wheel 3 changes in its driving state alternately between a state of being imparted with a driving force and a state of being imparted with no driving force. Therefore, the front wheel 3 is able to recover a grip force with the road surface reliably and promptly in a time period of the state where no driving force is imparted. Similarly, if the fourth value is provided as zero, when a slipping state of the rear wheel 4 is detected, the rear wheel 4 changes in its driving state alternately between a state of being imparted with a driving force and a state of being imparted with no driving force. Therefore, the rear wheel 4 recovers a grip force with the road surface reliably and promptly in a time period of the state where no driving force is imparted.

The second value is preferably a value (for example, zero) where the front wheel electric motor 13 no longer imparts a driving force to the front wheel 3. Accordingly, the front wheel 3 is able to recover a grip force with the road surface reliably and promptly in a time period of the state where no driving force is imparted. Similarly, the fourth value is preferably a value where the rear wheel electric motor 14 no longer imparts a driving force to the rear wheel 4. Accordingly, the rear wheel 4 is able to recover a grip force with the road surface reliably and promptly in a time period of the state where no driving force is imparted.

The second value is preferably a value (for example, zero) where a relative speed of the front wheel 3 to a road surface that the front wheel 3 contacts becomes zero. Because a contact surface of the front wheel 3 with the road surface accordingly reaches a state of standstill with respect to the road surface, a static friction force acts therebetween. The front wheel 3 thus recovers a grip force with respect to the road surface reliably and promptly. That is, there is a transition from a state in which the front wheel 3 and the road surface cause a slip to have a kinetic friction force acting therebetween to a state in which the relative speed of the front wheel 3 and the road surface becomes zero to have a static friction force acting therebetween. Because the static friction force is greater than the kinetic friction force, the front wheel 3 recovers a grip force with respect to the road surface reliably and promptly. For the same reason, the fourth value is preferably a value (for example, zero) where a relative speed of the rear wheel 4 to a road surface that the rear wheel 4 contacts becomes zero.

Further, in the present preferred embodiment, when neither the front wheel 3 nor the rear wheel 4 is in a slipping state, the front wheel torque command value and rear wheel torque command value both have values according to an output of the pedal force sensor 41 or the accelerator sensor 42. When the front wheel 3 reaches a slipping state, the front wheel torque command value repeatedly fluctuates alternately between the first value and second value. On the other hand, the rear wheel torque command value is provided as a value greater than that at normal time, and a reduction in the driving force of the front wheel 3 is made up by an increase in the driving force of the rear wheel 4. Similarly, when the rear wheel 4 reaches a slipping state, the rear wheel torque command value repeatedly fluctuates alternately between the third value and fourth value. On the other hand, the front wheel torque command value is provided as a value greater than that at normal time, and a reduction in the driving force of the rear wheel 4 is made up by an increase in the driving force of the front wheel 3. In this manner, when either one of the front wheel 3 and the rear wheel 4 reaches a slipping state, the wheel having reached a slipping state is intermittently driven, and its grip force is promptly recovered. On the other hand, as a result of the driving force of the other wheel not in a slipping state being increased, a driving force that is sufficient as a whole is imparted to the two-wheeled electric vehicle 1. Accordingly, a two-wheeled electric vehicle 1 that is capable of stable running and that generates a stable driving force irrespective of road surface conditions is provided.

Also, in the present preferred embodiment, the front wheel torque command value calculation unit 53 continuously changes (increases) the front wheel torque command value at the time of detection of a rear wheel slip. Accordingly, because the driving force of the front wheel 3 continuously increases when the rear wheel 4 is intermittently driven, even when the rear wheel 4 is in a slipping state, fluctuations in the driving force are significantly reduced to improve riding feeling. Similarly, in the present preferred embodiment, the rear wheel torque command value calculation unit 54 continuously changes (increases) the rear wheel torque command value at the time of detection of a front wheel slip. Accordingly, because the driving force of the rear wheel 4 continuously increases when the front wheel 3 is intermittently driven, even when the front wheel 3 is in a slipping state, fluctuations in the driving force are significantly reduced to improve riding feeling.

Also, in the present preferred embodiment, a sum of a time averaged value of the front wheel torque command value and a time averaged value of the rear wheel torque command value is equal between the time of slip detection and the time of no slip detection. Because a driving force that is equal as a whole is imparted to the two-wheeled electric vehicle 1 regardless of whether being in a slipping state, the driving force is stabilized, and a satisfactory riding feeling is obtained.

Also, in the present preferred embodiment, the slip detection unit 50 detects slipping states of the front wheel 3 and the rear wheel 4 by a comparison in the rotation speed of the front wheel 3 and the rear wheel 4. Accordingly, because slipping states of the front wheel 3 and the rear wheel 4 are reliably detected, the front wheel 3 or the rear wheel 4 is reliably recovered from the slipping state.

Although a preferred embodiment of the present invention has been described above, the present invention may be carried out in yet other modes as will be exemplified below.

The two-wheeled electric vehicle 1 described above in the preferred embodiment preferably includes the human power drive system 31 and the electromotive drive system 32, but the human power drive system 31 may be omitted. In this case, the pedal force sensor 41 is omitted, and the front wheel torque command value calculation unit 53 and the rear wheel torque command value calculation unit 54 are configured or programmed to calculate a front wheel torque command value and a rear wheel torque command value, respectively, according to an output signal of the accelerator sensor 42. The accelerator operator is not limited to the accelerator grip 28, and may be an accelerator lever.

In the preferred embodiment described above, the accelerator grip 28 and the acceleration sensor 42 preferably are provided, but these may be omitted. In this case, the front wheel torque command value calculation unit 53 and the rear wheel torque command value calculation unit 54 calculate a front wheel torque command value and a rear wheel torque command value, respectively, according to an output signal of the pedal force sensor 41.

In the preferred embodiment described above, a vehicle preferably including the two driving wheels 3 and 4 has been described, but the number of driving wheels may not be two. That is, in the vehicle according to the present invention, only one driving wheel may be provided, or three or more driving wheels may be provided, for example. Also, in the vehicle according to the present invention, a driven wheel(s) that follows in accordance with running of the vehicle may or may not be provided. For example, in the case of a two-wheeled vehicle having a front wheel and a rear wheel, either one of the front wheel and rear wheel may be a driving wheel, and the other of those may be a driven wheel. Also, only the driving force of a human power drive system may be supplied to either one of the front wheel and rear wheel, and only the driving force of an electromotive drive system may be supplied to the other of those. As a more generalized description, a plurality of driving wheels may include at least one wheel to which only the driving force of a human power drive system is supplied, and at least one wheel to which only the driving force of an electromotive drive system is supplied. The total number of wheels may not be two, and may be one, or may be three or more, for example.

Detection of a wheel slip is performed preferably by comparing the rotation speeds of driving wheels in the preferred embodiment mentioned above. However, detection of a wheel slip can also be performed by a comparison in the rotation speed of a driving wheel with a driven wheel. In the case of a vehicle in which only one wheel is provided, if the angular acceleration of a wheel (driving wheel) exceeds a predetermined threshold, it can be determined that the wheel is in a slipping state. Detection of a wheel slip suffices to be performed only in terms of a driving wheel, and slip detection of a driven wheel may not be performed.

Even in the case where two or more driving wheels are provided, it suffices to detect a slipping of at least one driving wheel, and when a slipping state of the driving wheel is detected, to fluctuate in a pulsed manner a torque command value of an electric motor that drives the driving wheel. Specifically, in the preferred embodiment described above, the detection of a slipping of the rear wheel 4 and the operation in the rear wheel slip mode may be omitted. Conversely, the detection of a slipping of the front wheel 3 and the operation in the front wheel slip mode may be omitted.

In the preferred embodiment described above, an example where the outer diameters of the front wheel 3 and the rear wheel 4 are equal or substantially equal has been described, but the outer diameters of these wheels may be different. In this case, the slip detection unit 50 may detect a slipping state of the front wheel 3 or the rear wheel 4 based on a wheel speed difference obtained by subtracting a rear wheel speed for which the rotation speed of the rear wheel 4 is converted to the speed of the vehicle 1 from a front wheel speed for which the rotation speed of the front wheel 3 is converted to the speed of the vehicle 1. That is, it can be determined that either the front wheel 3 or the rear wheel 4 is in a slipping state if the absolute value of a vehicle speed difference is over a threshold, and if not so, that neither the front wheel 3 nor the rear wheel 4 is in a slipping state. When it has been determined to be in a slipping state, if the wheel speed difference is positive (front wheel speed>rear wheel speed), the front wheel 3 can be identified to be in a slipping state, and if the wheel speed difference is negative (front wheel speed<rear wheel speed), the rear wheel 4 can be identified to be in a slipping state.

The first value of a front wheel torque command value in the front wheel slip mode can be determined to be a value that is greater than 0% of a corresponding front wheel torque command value in the non-slip mode and smaller than 100%. Similarly, the third value of a rear wheel torque command value in the rear wheel slip mode can be determined to be a value that is greater than 0% of a corresponding rear wheel torque command value in the non-slip mode and smaller than 100%. The word "corresponding" indicates corresponding to the same output of the pedal force sensor 41 or the accelerator sensor 42 (the same operation amount of the drive torque operator).

The second value of a front wheel torque command value in the front wheel slip mode can be determined to be a value that is 0% or more and less than 100% of the first value. In addition, the second value may also be determined, as described above, to be a negative value (a value corresponding to a torque on the braking side). Similarly, the fourth value of a rear wheel torque command value in the rear wheel slip mode can be determined to be a value that is 0% or more and less than 100% of the third value. In addition, the fourth value may also be determined to be a negative value (a value corresponding to a torque on the braking side) as described above.

In the front wheel slip mode, similar to in the case of the non-slip mode, the rear wheel torque command value may be provided as a normal value corresponding to an output of the pedal force sensor 41 or the accelerator sensor 42. Likewise, in the rear wheel slip mode, similar to in the case of the non-slip mode, the front wheel torque command value may be provided as a normal value corresponding to an output of the pedal force sensor 41 or the accelerator sensor 42.

The present application corresponds to Japanese Patent Application No. 2013-238175 filed in the Japan Patent Office on Nov. 18, 2013, and the entire disclosure of the application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a first wheel;
   a first electric motor configured to drive the first wheel;
   a drive torque operator configured to be operated by an operator;
   a slip detection unit configured to detect a slipping state of the first wheel;
   a first torque command value calculation unit configured or programmed to, at a time of no detection of a first wheel slip when the slip detection unit has not detected the slipping state of the first wheel, calculate a first torque command value for the first electric motor according to an input to the drive torque operator, and at a time of detection of the first wheel slip when the slip detection unit has detected the slipping state of the first wheel, calculate the first torque command value such that the first torque command value repeatedly fluctuates alternately between a first value not more than the first torque command value at the time of no detection of the first wheel slip and a second value smaller than the first value; and
   a first motor drive unit that is configured to drive the first electric motor according to the first torque command value calculated by the first torque command value calculation unit.

2. The vehicle according to claim 1, wherein the first value is equal to the first torque command value at the time of no detection of the first wheel slip.

3. The vehicle according to claim 1, wherein the second value is zero.

4. The vehicle according to claim 1, further comprising a second wheel separate from the first wheel; wherein
   the slip detection unit is configured to judge whether the first wheel is in the slipping state by a comparison of a rotation speed of the first wheel with a rotation speed of the second wheel.

5. The vehicle according to claim 1, further comprising:
   a second wheel separate from the first wheel;
   a second electric motor separate from the first electric motor and configured to drive the second wheel;
   a second torque command value calculation unit configured or programmed to, at the time of no detection of the first wheel slip when the slip detection unit has not detected the slipping state of the first wheel, calculate a second torque command value for the second electric motor according to the input to the drive torque operator, and at the time of detection of the first wheel slip when the slip detection unit has detected the slipping state of the first wheel, calculate the second torque command value to be greater than the second torque command value at the time of no detection of the first wheel slip; and
   a second motor drive unit configured to drive the second electric motor according to the second torque command value calculated by the second torque command value calculation unit.

6. The vehicle according to claim 5, wherein
   the slip detection unit is configured to further detect a slipping state of the second wheel;
   the first torque command value calculation unit is configured or programmed to, at a time of no detection of slip of the first wheel and the second wheel when the slip detection unit has not detected a slipping state of either the first wheel or the second wheel, calculate the first torque command value for the first electric motor according to the input to the drive torque operator, and at the time of detection of the first wheel slip when the slip detection unit has detected the slipping state of the first wheel, calculate the first torque command value such that the first torque command value repeatedly fluctuates alternately between the first value not more than the first torque command value at the time of no detection of slip of both the first wheel and the second wheel and a second value smaller than the first value, and at a time of detection of a second wheel slip when the slip detection unit has detected the slipping state of the second wheel, calculate the first torque command value to be greater than the first torque command value at the time of no detection of slip of both the first wheel and the second wheel; and
   the second torque command value calculation unit is configured or programmed to, at the time of no detection of slip of both the first wheel and the second wheel when the slip detection unit has not detected the slipping state of either the first wheel or the second wheel, calculate a second torque command value for the second electric motor according to the input to the drive torque operator, and at the time of detection of the second wheel slip when the slip detection unit has detected the slipping state of the second wheel, calculate the second torque command value such that the second torque command value repeatedly fluctuates alternately between a third value not more than the second torque command value at the time of no detection of slip of both the first wheel and the second wheel and a fourth value smaller than the third value, and at the time of detection of the first wheel slip when the slip detection unit has detected a slipping state of the first wheel, calculate the second torque command value to be greater than the second torque command value at the time of no detection of slip of both the first wheel and the second wheel.

7. The vehicle according to claim 6, wherein the first torque command value calculation unit is configured or programmed to continuously change the first torque command value at the time of detection of the second wheel slip.

8. The vehicle according to claim 5, wherein the second torque command value calculation unit is configured or programmed to continuously change the second torque command value at the time of detection of the first wheel slip.

9. The vehicle according to claim 5, wherein the first torque command value calculation unit and the second torque command value calculation unit are configured or programmed to, at the time of slip detection of the first wheel or the second wheel, respectively calculate the first and second torque command values such that a sum of a time averaged value of the first torque command value and the time averaged value of the second torque command value becomes equal to a time averaged value of a sum of the first torque command value and the second torque command value at the time of no slip detection.

10. The vehicle according to claim 1, wherein the drive torque operator includes an accelerator operator that is operated by an operator.

11. The vehicle according to claim 1, wherein the drive torque operator includes a pedal to input human power by an operator.

* * * * *